Patented Aug. 28, 1945

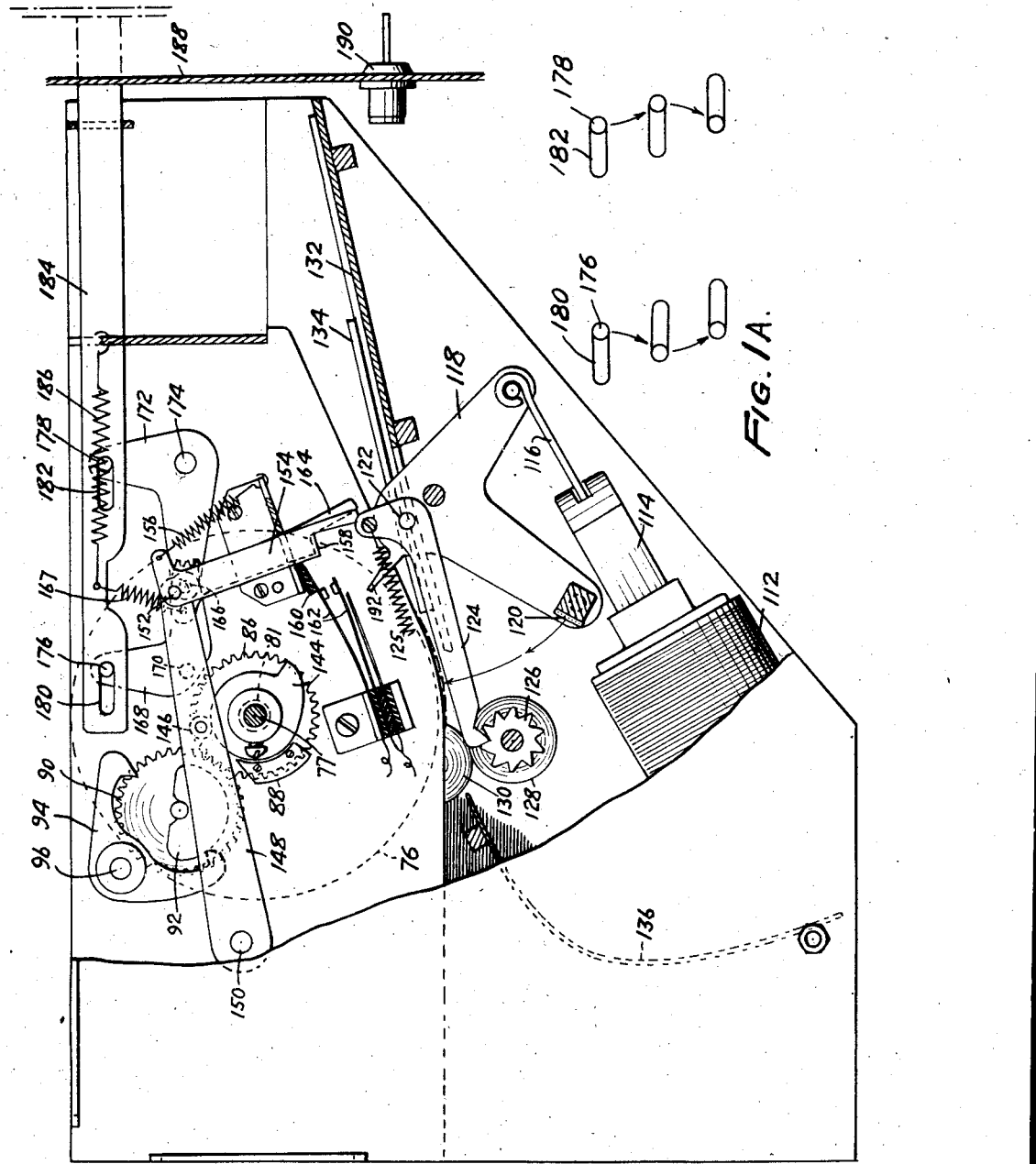

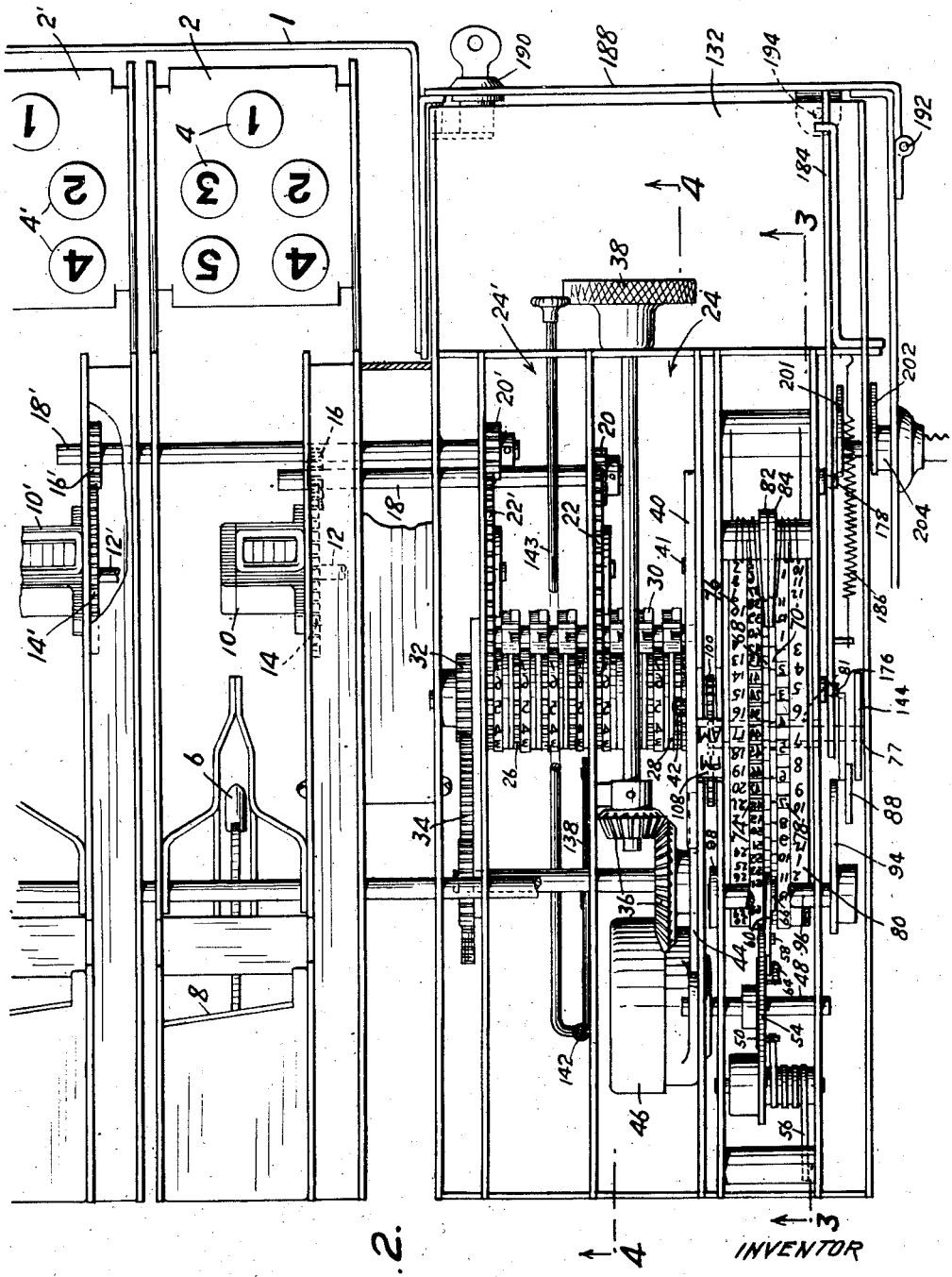

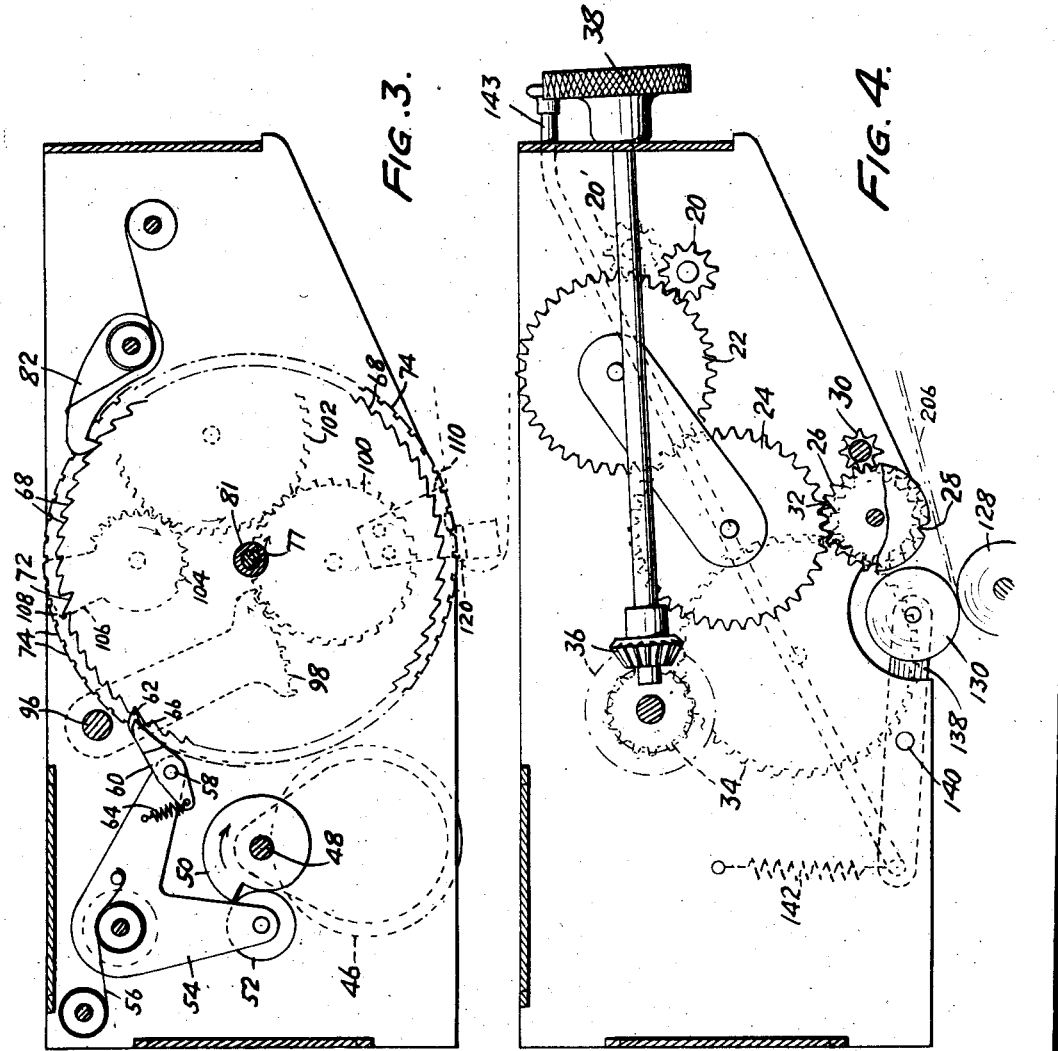

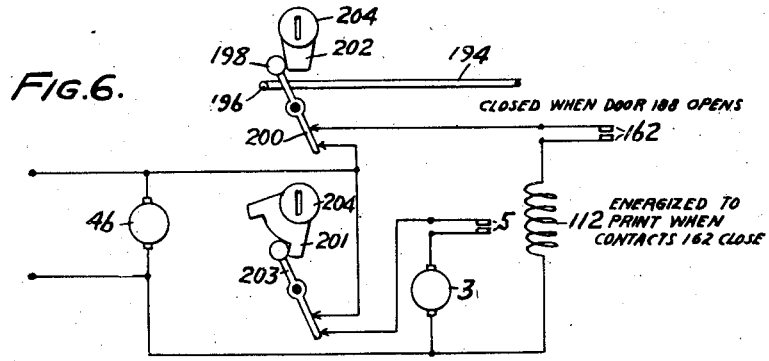
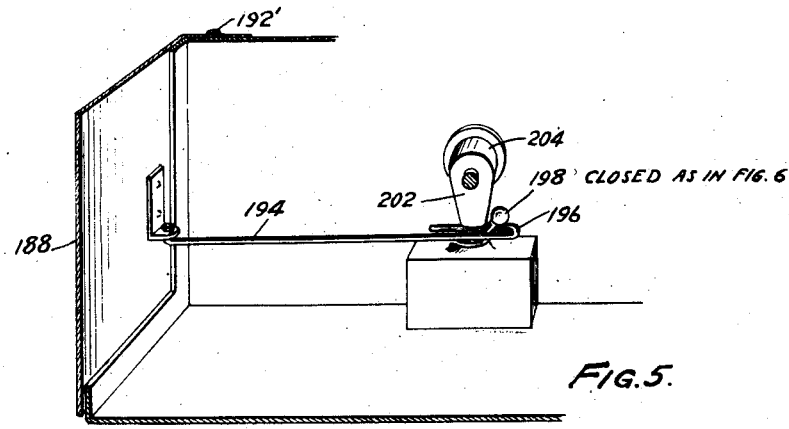
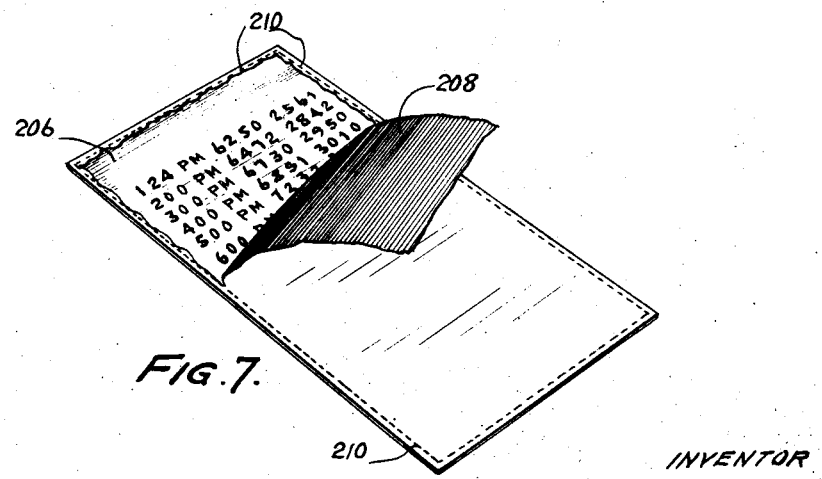

2,383,796

UNITED STATES PATENT OFFICE 2,383,796

TICKET ISSUING MACHINE

Reuben H. Helsel, Long Island City, N. Y., assignor to General Register Corporation, New York, N. Y., a corporation of Pennsylvania Application April 23, 1940, Serial No. 331,103

14 Claims. (Cl. 234—2)

This invention relates to an accounting device for ticket issuing machines, and particularly to a device which will provide a printed record of the issue of tickets.

At the present time ticket issuing machines, for example, of the type used in theaters, are provided with counters which indicate the total number of tickets issued by the machines. These counters are generally so arranged as to be inaccessible to the cashier who operates the machine and are usually of a type which cannot be set back without substantial dismantling of the machine. Usually the manager of a theater will examine these counters from day to day and report their indications to the theater owner, who may possibly own a chain of theaters. Unless the owner has an auditor examine the counters, it is possible for the manager to make erroneous reports for fraudulent purposes. It is further desirable to know the amount of business a theater does at various hours, and also to have a record of the time when the theater is open for business.

It is a broad object of the present invention to provide an accounting device adapted to be operated by one or more ticket issuing machines to issue a sealed printed record showing various data regarding the operation of the machine. These data, for example, may consist of the number of tickets indicated by the counter of each unit of the machine at the time the theater is opened and then the indications of the counters of the various units at, for example, hourly intervals throughout the period of use.

The general objects, as well as specific objects, particularly relating to details of operation, will be apparent from the following description, read in conjunction with the accompanying drawings, in which:

Figure 1 is a side elevation, partially in section, of the left hand side of the accounting device;

Figure 1A is a diagram illustrating certain control actions occurring in the opening and closing of a door of the device;

Figure 2 is a plan view, with parts broken away, showing the accounting device and its association with a plurality of ticket issuing units;

Figure 3 is a vertical section, taken on the plane indicated at 3—3 in Figure 2;

Figure 4 is a vertical section taken on the plane indicated at 4—4 in Figure 2;

Figure 5 is a fragmentary perspective illustrating the control of a main switch by operations under the control of a ticket issuing attendant and the manager of a theater, respectively;

Figure 6 is a wiring diagram showing the electrical connections of the machine; and Figure 7 is a perspective view showing a preferred type of record member on which entries are made by the machine.

A casing 1 is provided for the accounting device and the ticket issuing units. This casing, which is indicated generally in the figures, is of a type which is conventional in ticket issuing devices. The casing is provided with a pair of locked doors, one of which (conventional and not shown) may be opened by the cashier by the use of a key for location of ticket strips within the machine to be fed through the ticket issuing units. Another door, indicated at 188, is adapted to be opened only by the theater manager. The ticket issuing units, which may be removed from the machine only by authorized persons, for example, the manager, are covered by the usual top plate provided with openings through which the tickets may be projected. This top plate is adapted to be readily removed by the operator when access is had to the ticket supply compartment, so that the operator may adjust tickets within the units or clean out dirt which might interfere with the operation thereof. The accounting apparatus, however, is preferably totally inaccessible to the operator. The above matters, except for the separate chamber for the accounting apparatus, are generally conventional in nature and need not be further described.

The machine as disclosed comprises a pair of ticket issuing units 2 and 2' adapted, for example, to issue tickets of two denominations in the usual fashion. It will be evident that more than two units may be tied into the accounting mechanism, but for purposes of description only two units and the corresponding accounting units are illustrated.

The ticket issuing units are merely diagrammatically illustrated as of the type disclosed in detail in my Patent No. 2,176,966, issued October 24, 1939. These units, driven by a common motor 3 (Figure 6), comprise keys 4 and 4' arranged to be depressed by an operator to issue varying numbers of tickets as indicated on the keys. The tickets are delivered by means of pinwheels 6 and are adapted to be severed in groups by means of a movable knife 8. A switch indicated at 5 (Figure 6) common to all the units (or a number of switches in parallel, each corresponding to a single unit) will cause the motor to be energized upon depression of any key.

The units 2 and 2' comprise counters 10 and 10' driven through shafts 12 and 12' by, for example, the type of mechanism illustrated in said co-pending application, so that in the absence of ticket strip to be issued the counters will not be operated despite operation of the units. The shafts 12 and 12′ of the counters carry gears 14 and 14′, respectively, which mesh with pinions 16 and 16′ carried by shafts 18 and 18′, respectively. The accounting mechanism comprises a number of accounting units corresponding to the number of ticket issuing units, and the shafts 18 and 18′ carry pinions 20 and 20′ in the respective corresponding accounting units, meshing with gears 22 and 22′ adapted to drive number printing devices. As illustrated in Figure 4, the gear 22 of one of these units drives through a gear 24 a pinion 26 which forms the operating pinion for the number printing head of this unit. The number printing head, indicated generally at 28, may be of conventional type and need not be described in detail, it being sufficient to point out that it should correspond in its denominational orders to the counter 10. The carrying of numbers is effected through the mutilated gear arrangement indicated at 30. The other number printing unit or units are the same as the one just described.

In some instances it is desirable that the number printing heads may be set back to zero. To accomplish this, a gear 32 is secured to a shaft running inside the heads and adapted in conventional fashion to zeroize them by its rotation. The gear 32 is driven by a series of gears indicated at 34 and 36 by a knob 38 projecting toward the front of the machine inside the door 188 which is under the control of the theater manager. The attainment of a zeroizing position is indicated to the person who manipulates the knob 38 by the dropping of a lever 40 pivoted at 41 under the action of a spring 42 into a notch in a cam 44 driven by the gearing. The presence of this lever in the notch can be felt and serves as an indication that the printing devices read zero. As will be explained hereafter, it is preferable to eliminate the zeroizing arrangement in most instances, so that the numbers printed by the devices 28 will correspond to the numbers indicated by the counters.

Included within the machine is a clockwork mechanism 46, preferably of the synchronous motor type, which drives a shaft 48 at one revolution per minute. As indicated in Figure 3, the shaft 48 carries a cam 50 with which there engages a roller 52 carried by one arm of a bell crank 54, which is urged in a counterclockwise direction as viewed in Figure 3 by a spring 56. The other arm of the bell crank has pivoted to it at 58 a pawl 60 which is provided with a nose portion 62 engageable under the action of a spring 64 with the teeth 68 carried by a drum 76 carried by a horizontal shaft 77. The pawl 60 has fixed to it a nose member 66 which normally clears the teeth 70 carried by a drum 80 located beside drum 76 and mounted on a sleeve 81 surrounding shaft 77. The sleeve 81 is journalled in the side supporting plates.

The drum 76 is provided with type 74 to print the numerals 00 to 59, to indicate minutes, while the drum 80 carries forty-eight type faces 78 to print four times over the numbers 1 to 12 to indicate hours. There are sixty teeth 68 and forty-eight teeth 70 carried by the respective drums and adapted to be acted upon by the pawl noses 62 and 66, respectively. Normally, when movement of the bell crank 54 takes place, only the drum 76 can be rotated because the nose 62 will not permit the nose 66 to drop sufficiently low to engage the ratchet teeth 70. However, in the transition from the "59" to "00," the nose 62 may drop into a deep recess 72 between the teeth, and consequently the nose 66 will engage a ratchet tooth 70 to change its position to print a subsequent hour. The stroke of the pawl 60 is, of course, sufficient to provide 1/48 revolution of the drum 80, and is less than sufficient to cause it to move back over two teeth of the ratchet 68. Thus the latter is advanced 1/60 of a revolution at each movement of the pawl and the former 1/48 of a revolution whenever a change of hour is required. Detents 82 and 84 are adapted to engage the two ratchets to prevent retrograde movement as the actuating pawl 60 moves on its reverse strokes.

The drums 76 and 80 carry numbers about their peripheries visible through a window, not shown, in the cover plate of the machine. The numbers are so arranged as to correspond to the type faces which are in printing position as described hereafter, so that the operator may see whether the correct time is being printed. If that for some reason should not be the case, a note of the fact should be made and the time indications corrected by the manager the next time he opens the machine.

The sleeve 81 carries a gear 86 on which may be secured in suitable position a cam 88, which is adapted, as described hereafter, to prevent the formation of records throughout certain periods of a day if such action is desired. The gear 86 meshes with a gear 90 journalled in the frame, which gear 90 carries a cam 92 adapted to act alternately upon the arms of a bell crank follower lever 94 secured to a shaft 96 mounted in the frame. This shaft 96 in turn carries a segment 98 meshing with a pinion 100, which carries on a downwardly depending extension 110 a pair of type faces adapted to print "A. M." and "P. M." designations. The pinion 100 meshes with a pinion 102, which in turn meshes with a pinion 104 having an upward extension, as indicated at 106 which has a face 108 on which are printed "A. M." and "P. M." markings arranged to be alternately visible through the window in the top plate through which there may be viewed the time indications on the drums 76 and 80. It will be evident that since the drum 80 rotates once in twenty-four hours, there will be at each half a revolution, due to the action of the cam 92, a change from an "A. M." to "P. M." indication at 108 and a corresponding change of type surface in the printing position. Thus a complete time indication is made visible and is adapted to be printed as pointed out hereafter.

Carried by the frame of the accounting unit is a solenoid 112 which, when energized, is adapted to pull upon a plunger armature 114 connected by a link 116 to a bell crank 118. This bell crank carries a transverse platen bar 120 faced with yielding material and adapted to act as a hammer to force upwardly against the type faces of the time indicating mechanism and of the numbering heads a member described hereafter on which a record is to be printed. The active position of all the type members is, of course, in line with this bar 120 so that across the record member there will be printed the simultaneous indications of all of these devices.

Pivoted to the bell crank 118 at 122 is a driving pawl 124 urged by spring 125 into engagement with the teeth of a ratchet 126 connected to a movable roller 128 cooperating with a second roller 130 to pinch and feed a record member guided to them over a plate 132, beneath edge guiding members 134. Upon each movement of the bell crank 118 a record member advancing step is imparted to the roller 128 so as to bring on the record member a clean surface in position for a subsequent printing. The record member is deflected downwardly as it is fed by the guiding plate 136.

The roller 128 is mounted in fixed bearings. The roller 130, on the other hand, is journalled in levers 138 pivoted at 140. One of these levers is connected to a spring 142 so as to cause the roller 130 to move downwardly to press the record member 206. A link 143 extending to the front of the machine may be pressed by the theater manager to raise the roller 130 to permit the ready insertion of the record member.

The shaft 77 carrying the drum 76 has secured to it a cam 144 located forwardly as viewed in Figure 1 to clear the cam 88. Upon the cam 144 there bears a roller 146 carried by a lever 148 pivoted in the frame at 150. This lever 148 has pivoted to it at 152 a link 154 having a shoulder 158 beneath which a portion of the link depends. A spring 156 attached to an ear at the upper end of link 154 urges it in a clockwise direction as viewed in Figure 1 and also serves to urge the roller 146 into engagement with cam 144. Normally the link 154 rests against a piece of insulation 160 carried by the upper one of a pair of spring switch members 162, normally sprung apart, as indicated in Figure 1.

A second link 164 provided with a similar shoulder and depending portion is pivoted at 166 to a bell crank 168 pivoted to the machine frame at 170. The arm of the bell crank to which this link is pivoted is provided with teeth meshing with teeth carried by the generally horizontal arm of a bell crank 172 pivoted to the machine frame at 174. The bell cranks 168 and 172 are respectively provided with pins 176 and 178 extending within slots 180 and 182 in a sliding bar 184 urged forwardly by a spring 186 into engagement with the door 188 controlled by the lock 190, which may be opened only by the theater manager. A spring 167 urges the link 164, in the same fashion as the link 154, into engagement with insulating piece 160.

As illustrated particularly in Figure 5, the door 188 is hinged at 192' and is adapted to be locked in closed position by the lock 190. Pivoted to it is a link 194 having a turned end 196 embracing the lever 198 of a switch 200. (See Figure 6.) By reason of this arrangement, the switch, which is of snap type, will necessarily be opened every time the door 188 is opened. At such time the operator should have removed the key from lock 204, as described below. The closing of the door, however, will not reclose this switch.

The lever 198 of the switch 200 is also engageable by the depending ear 202 of a lock 204, which may be operated only by the cashier. When the cashier leaves the machine, the ear 202 may be turned counter-clockwise as viewed in Figure 6 to a substantially horizontal position away from the lever 198. Such movement, however, will not open the switch. On the other hand, if the switch is in open position, a reverse movement of the lock effected by the cashier will result in closing of the switch so as to place the machine in condition for further operation.

As illustrated in the diagram of Figure 6, there is a second switch 203 in the circuit of the motor 3 which is controlled by the lock 204 through the action of a forked arm 201. This arrangement is such that when the cashier turns ear 202 counterclockwise as above stated, switch 203 will be opened so that depression of the machine keys cannot effect operation of any of the units. On the other hand, unlocking of the machine closes switch 203 so that operation is possible.

The record member which is used in the machine is illustrated in Figure 7. In its preferred form it comprises a sheet 206 of paper which may be a fairly stiff cardboard. Above this with its treated face against the sheet 206 is a sheet of carbon paper 208. The two sheets may be secured together at their edges in any desired fashion, for example, the securing may be effected by sewing machine stitches 210. These have the advantage over adhesive that if the sheets are separated and an attempt is made to resew them together, it is practically impossible to effect the restitching without showing the marks from the preceding stitching. What is desired in the way of a record member is a sealed member to be delivered to the owner of the theater, who can be assured from its appearance that the records which it contains were made by the machine. In fact, in addition to the markings already indicated as being made on this record, each machine might make some characteristic mark, so that the machine making the record can be positively identified.

The operation of the mechanism described will now be readily understood. At the end of a day, the cashier will have turned the lock 204 counterclockwise so as to bring the ear 202 to a horizontal position, away from its position, as viewed in Figure 6, away from the switch lever 198, and so as to open switch 203. Preferably the lock is of such nature that the key cannot be withdrawn unless the ear is in such position. As will be evident from the wiring diagram of Figure 6, this leaves open the circuit of motor 3. The contacts 162 will be separated so that no current will be flowing through the solenoid 112. The electrical clock mechanism 46 is permanently connected across the line so as to operate continuously.

At this time, the various parts of the machine will occupy the positions indicated in the figures, i. e., the shoulders of both the links 154 and 164 will be below the insulating piece 160 and the links will be resting against this insulating piece. The record member will be in the machine carrying a number of records, made as described below at each hour.

After the closing of the box office, the manager of the theater should remove from the machine the record member therein and replace it with a new one on which will be made the records for the following day. To effect this, he will unlock the door 188 and swing it open. As the door moves to its open position, the pin 178 will move to the right as the slide 184 is released to be moved to the right by a spring 186, this movement taking place because of the action of the spring 167 on the bell crank 168, which, as mentioned above, has teeth engaging corresponding teeth of the bell crank 172. The result of this movement is that the link 164 (and also link 154 idly) will be raised until its shoulder clears the insulating member 160, whereupon the spring 167 will move it clockwise, causing the shoulder to extend above this member. As further movement of the slide 184 takes place, the left hand end of the slot 180 will engage the pin 176, which has heretofore moved toward the left. Thereupon this pin 176 will be forced toward the right under the action of spring 186 and reverse movements of the bell cranks 168 and 172 will occur, forcing the link 164 (also link 154) downwardly and, through the action of its shoulder, causing contact of the two switch members 162. The sequence of operations involving the action of the slots 180 and 182 upon pins 176 and 178 to secure movements of the bell cranks 168 and 172 as just described will be evident from the diagram in Figure 1A. From this it will be seen that as the door is opened the pins move divergently in the slots under the action of spring 167. As opening takes place, the control is effected first by the right-hand end of the slot 182 and then the control is assumed by the left-hand end of the slot 180. The opposite ends of the slots in the extreme position merely serve as stops to the motion of the link 184. Upon closing the door the sequence of operations occurs in reverse. As will be evident from Figure 6, this causes energization of the solenoid 112, which will pull its armature 114 violently inward, causing the platen member 120 to hammer the record member, which has its carbon facing sheet against the type of the hour and minute drums, the type indicating "A. M." or "P. M.", and also against the numbering type of the numbering heads. Thus a record of the numbers will be made at the instant the door is opened. As the bell crank 118 reaches the end of its swing, the ear 192 thereof will engage the tail of the link 164 (also link 154), forcing it forwardly to clear the insulating piece 160, thus causing an immediate opening of the switch 162. The solenoid is thus immediately released and the platen member 120 and its carrying bell crank will drop under the action of gravity leaving the parts in the position illustrated, but with the slide 184 in its extreme forward position illustrated in dotted lines in Figure 1.

All these actions will have occurred before the loop 196 of the link 194 engages lever 198 and opens the switch 200. The opening of the switch occurs, however, as soon as the door 188 opens to any appreciable extent sufficient to give any access whatever into the interior of the compartment which it closes, i. e., all of these actions occur in rapid sequence in the initial portion of the door opening movement.

The manager can now remove the record sheet by pressing the link 143 inwardly to force upward the roller 130.

The manager should now place in the machine a new record sheet with its carbon paper uppermost in position to be pinched between the rollers 128 and 130. He will then close the door 188 and lock it. As the door is closed the link 194 is ineffective to reclose the switch 200, since the loop 196 is open at its left hand end as viewed in Figure 5. Thus the machine remains deenergized. As the door closes, however, a reverse action on the bell cranks 168 and 172 occurs and again the link 164 is raised to bring its shoulder above 160 and is then lowered to close switch 162. Since the circuit is open at switch 200 the solenoid is not energized to make a record and, of course, it is ineffective to cause the ear 192 to remove link 164 from engagement with 160. Thus switch 162 remains closed.

As soon as the cashier opens the box office the next day, her first action to put the machine in operation must be to turn the lock 204 by means of her key to cause the ear 202 to close the switch 200 and the fork 201 to close switch 203, thus providing a circuit through the motor 3 whenever the switch, indicated at 5, of the ticket issuing machine is closed. The closing of the switch 200 will immediately energize the solenoid 112, so that it will immediately make a record of the time and the numbers on the number heads. As this occurs, the link 164 (also link 154) will be released from member 160 by operation of ear 192 and the switch 162 opened.

As the bell crank 118 returns to initial position following the making of this record a step movement will be imparted to the roller 128 through the action of the pawl 124, thus bringing a clean portion of the record member into recording position.

Following this initial operation of the accounting mechanism at the beginning of the day, a record is made every hour thereafter. This recording will take place due to the action of the link 154 in the same fashion as that described in connection with link 164. The link 154 will be raised by the cam 144 and on the hour the roller 146 will be released by this cam so that the shoulder on the link 154 will effect closure of the switch 162. A record will be made and the switch will immediately open by the action of ear 192 on the tail of the link. After each such operation the record member is advanced by the movement of the roller 128.

Upon a change from morning to afternoon, the "A. M." type will be removed from active position and "P. M." substituted through the action of the cam 92.

This action will normally continue through the day until the cashier leaves the machine and withdraws her key from the lock 204.

In the machine illustrated, there has been shown a zeroizing arrangement manipulated through the knob 38. Ordinarily this zeroizing arrangement is not desirable, but the numbering heads should continuously print numbers corresponding to the numbers indicated by the counters 10 and 10'. If it is desirable, however, that the number of tickets should be started at each day from zero, the knob 38 may be provided to effect zeroizing of the numbering heads.

It will be evident that the hourly recording of numbers of tickets will occur from the time the machine is first opened until the manager, by opening the door 188, opens the switch 200. After that time, of course, the link 154 will still be periodically raised by the clock action, so that its shoulder 158 will move above member 160. This, however, only duplicates the action of the link 164 and effects no result. It sometimes happens that a theater may be open for a matinee and then closed for a number of hours until the evening. It would thus be unnecessary to have recording take place during this interval. To prevent recording during this period, it is only necessary to place on the gear 86, which moves with the hour printing drum, a suitable cam 88 to raise and hold out of action the roller 146 during the period of inactivity which is desired.

The type of record which is made is indicated in Figure 7, in which there is illustrated the condition of the record member when it has been partially opened by tearing away the carbon paper 208 from the face of the sheet 206 on which the printing has occurred. The first entry is that made by the cashier when she turned her key in its lock. Subsequent records are the hourly records of the numbers of tickets of the two units. The last record is that made when the manager opened the door to remove the record member.

In the event that duplicate sheets are necessary for different offices, it is, of course, only required that a series of sheets and corresponding carbon paper sheets should be included in the record member.

It will be clear that numerous variations in the embodiment of the invention may be made without departing from its scope as defined in the following claims.

What I claim and desire to protect by Letters Patent is:

1. A machine of the type described comprising means for feeding and issuing tickets, means indicating the number of tickets issued by said means, means for automatically recording at predetermined time intervals the indications of said indicating means, controlling means manipulable to prevent ad permit normal operation of the first means during desired periods, and means for additionally recording the indications of said indicating means when the last means is manipulated to permit normal operation after a period of inactivity.

2. A machine of the type described comprising means for feeding and issuing tickets, means indicating the number of tickets issued by said means, means for automatically recording at predetermined time intervals the indications of said indicating means, a closure for a chamber in said machine, and means operable upon opening of said closure to record additionally the indications of said indicating means at the time of opening.

3. A machine of the type described comprising means for feeding and issuing tickets, means indicating the number of tickets issued by said means, means manipulable to prevent and permit normal operation of the first means during desired periods, and means for recording the indications of said indicating means when the last means is manipulated to permit normal operation after a period of inactivity.

4. A machine of the type described comprising means for feeding and issuing tickets, means indicating the number of tickets issued by said means, a closure for a chamber in said machine, and means operable upon opening of said closure to record the indications of said indicating means.

5. A machine of the type described comprising means for feeding and issuing tickets, means indicating the number of tickets issued by said means, controlling means manipulable to prevent and permit normal operation of the first means during desired periods, a closure for a chamber in said machine, and means for recording the indications of said indicating means set in condition to operate when said closure is closed after an opening thereof and for recording the indications of said indicating means when the manipulable means is manipulated to permit normal operation after the closing of said closure and after a period of inactivity.

6. A machine of the type described comprising means for feeding and issuing tickets, means indicating the number of tickets issued by said means, and means for automatically recording at predetermined time intervals indications of said indicating means and the time of said recording.

7. A machine of the type described comprising means for feeding and issuing tickets, controlling means manipulable to prevent and permit normal operation of said means during desired periods, and means for recording the time when the last means is manipulated to permit normal operation after a period of inactivity.

8. A machine of the type described comprising means for feeding and issuing tickets, means indicating the number of tickets issued by said means, means for automatically recording on a record member at predetermined time intervals the indications of said indicating means, means manually manipulable for additionally recording on the record member the indications of said indicating means at the time of manual manipulation, and means for feeding said record member between successive recordings.

9. A machine of the type described comprising means for feeding and issuing tickets, means indicating the number of tickets issued by said means, manually operable means for recording on a record member the indications of said indicating means, and means for feeding said record member between successive recordings.

10. A machine of the type described comprising means for feeding and issuing tickets, means indicating the number of tickets issued by said means, a chamber arranged to receive a record member, a closure for said chamber, and means for automatically recording at predetermined time intervals indications of said indicating means on the record member when the closure is closed.

11. A machine of the type described comprising means for feeding and issuing tickets, means indicating the number of tickets issued by said means, a chamber arranged to receive a record member, a closure for said chamber, and means for recording on the record member, when said closure is opened, the indications of said indicating means.

12. A machine of the type described comprising means for feeding and issuing tickets, means indicating the number of tickets issued by said means, a chamber arranged to receive a record member, controlling means manipulable to prevent and permit normal operation of the first means during desired periods, and means for recording on the record member the indications of said indicating means when the manipulable means is manipulated to permit normal operation.

13. A machine of the type described comprising means for feeding and issuing tickets, means indicating the number of tickets issued by said means, a chamber arranged to receive a record member, a closure for said chamber, controlling means manipulable to prevent and permit normal operation of the first means during desired periods, and means for recording the indications of said indicating means when the manipulable means is manipulated to permit normal operation only following an opening and reclosing of said closure.

14. A machine of the type described comprising means for feeding and issuing tickets, means indicating the number of tickets issued by said means, a chamber arranged to receive a record member, a closure for said chamber, controlling means manipulable to prevent and permit normal operation of the first means during desired periods, and means for recording on the record member the indications of said indicating means when said closure is opened, said last means being operative after the closing of said closure only if said manipulable means is manipulated to permit normal operation of the first means prior to the reopening of the closure.

REUBEN H. HELSEL.